United States Patent
Moscetti et al.

(10) Patent No.: US 10,036,422 B2
(45) Date of Patent: Jul. 31, 2018

(54) TAPERED-LAND THRUST BEARING FOR TURBOCHARGERS

(71) Applicant: BorgWarner Inc., Auburn Hills, MI (US)

(72) Inventors: Jason P. Moscetti, Hendersonville, NC (US); Christian Longacre, Asheville, NC (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 14/395,567

(22) PCT Filed: Mar. 6, 2013

(86) PCT No.: PCT/US2013/029233
§ 371 (c)(1),
(2) Date: Oct. 20, 2014

(87) PCT Pub. No.: WO2013/162703
PCT Pub. Date: Oct. 31, 2013

(65) Prior Publication Data
US 2015/0086144 A1    Mar. 26, 2015

Related U.S. Application Data

(60) Provisional application No. 61/637,565, filed on Apr. 24, 2012.

(51) Int. Cl.
| | |
|---|---|
| *F16C 33/10* | (2006.01) |
| *F16C 17/04* | (2006.01) |
| *F01D 25/16* | (2006.01) |
| *F02B 39/14* | (2006.01) |

(52) U.S. Cl.
CPC ........ *F16C 33/1085* (2013.01); *F01D 25/168* (2013.01); *F16C 17/04* (2013.01);
(Continued)

(58) Field of Classification Search
CPC ...... F16C 17/04; F16C 17/042; F16C 17/047; F16C 17/59; F16C 33/1075; F16C 33/1085; F16C 2360/24; F01D 25/168; F02C 7/06
USPC .......................................... 384/105, 124, 125
See application file for complete search history.

(56) References Cited

U.S. PATENT DOCUMENTS 3,291,543 A * 12/1966 Nigh ...................... F16C 17/042
                                                      384/125
4,453,837 A *  6/1984 Shimizu ............... F16C 33/1075
                                                      384/121
(Continued)

FOREIGN PATENT DOCUMENTS

| JP | 2004036790 | 2/2004 |
| JP | 2011080520 | 4/2011 |

OTHER PUBLICATIONS

International Search Report from the International Bureau of WIPO dated Nov. 6, 2014 for PCT/US2013-029233.

*Primary Examiner* — James Pilkington
(74) *Attorney, Agent, or Firm* — Young Basile Hanlon & MacFarlane, P.C.

(57) ABSTRACT

An oil-lubricated, tapered-land thrust bearing assembly (60) for automotive turbochargers (10) including a thrust bearing (30). The thrust bearing (30) includes an assembly of a base (62) with at least one insert (64 or 66), which is designed to control the oil film as a purposefully compliant structure based on applied force to optimize performance at low and high power operation. The ramp angle is relatively large at a low load and decreases to a smaller ramp angle at higher loads. On one side of the turbocharger (10), the thrust bearing assembly (60) may operate with a flinger sleeve (34) and a thrust washer (24) within a complementary bearing housing cover (32).

19 Claims, 7 Drawing Sheets

(52) U.S. Cl.
CPC .......... *F16C 17/042* (2013.01); *F16C 17/047* (2013.01); *F16C 33/1075* (2013.01); *F02B 39/14* (2013.01); *F05D 2220/40* (2013.01); *F05D 2240/52* (2013.01); *F05D 2240/53* (2013.01); *F05D 2250/192* (2013.01); *F05D 2250/292* (2013.01); *F05D 2250/314* (2013.01); *F05D 2250/90* (2013.01); *F05D 2260/98* (2013.01); *F16C 2360/24* (2013.01)

(56) References Cited

U.S. PATENT DOCUMENTS

| | | | |
|---|---|---|---|
| 4,479,728 A | | 10/1984 | Miller |
| 4,624,583 A | * | 11/1986 | Saville .................. F16C 17/042 384/105 |
| 4,639,148 A | * | 1/1987 | Tamura ............... F16C 33/1075 384/112 |
| 4,871,267 A | * | 10/1989 | Gu ........................ F16C 17/042 384/105 |
| 7,401,980 B2 | | 7/2008 | Krauss et al. |
| 7,458,724 B2 | * | 12/2008 | Groves .................. F01D 25/18 384/121 |
| 7,909,578 B2 | | 3/2011 | Nishiyama et al. |
| 8,672,610 B2 | * | 3/2014 | Berger .................... F01D 25/16 415/104 |
| 9,181,955 B1 | * | 11/2015 | House .................. F16C 27/045 |
| 2012/0033908 A1 | * | 2/2012 | House .................... F01D 25/16 384/476 |
| 2016/0010492 A1 | * | 1/2016 | Cavagnaro ............. F01D 17/02 417/423.1 |

* cited by examiner

TAPERED-LAND THRUST BEARING FOR TURBOCHARGERS

CROSS-REFERENCE TO RELATED APPLICATION

The following application is a United States national stage application of International Patent Application No. PCT/US2013/02933, filed on Mar. 6, 2013, which claims priority to and all the benefits of U.S. Provisional Application No. 61/637,565, filed on Apr. 24, 2012, and entitled "Tapered-Land Thrust Bearing for Turbochargers."

BACKGROUND

Field of the Disclosure

This disclosure relates to a component for turbochargers for internal combustion engines. More particularly, this disclosure relates to a tapered-land thrust bearing assembly with inserts (such as ramps or pads) for varying effective geometry to increase the bearing's optimal operating range.

Description of Related Art

Advantages of turbocharging include increased power output, lower fuel consumption and reduced pollutant emissions. The turbocharging of engines is no longer primarily seen from a high power performance perspective, but is rather viewed as a means of reducing fuel consumption and environmental pollution on account of lower carbon dioxide ($CO_2$) emissions. Currently, a primary reason for turbocharging is using the exhaust gas energy to reduce fuel consumption and emissions. In turbocharged engines, the combustion air is pre-compressed before being supplied to the engine. The engine aspirates the same volume of air-fuel mixture as a naturally aspirated engine, but due to the higher pressure, thus higher density, more air and fuel mass is supplied into the combustion chamber. Consequently, more fuel can be burned, so that the engine's power output increases relative to the speed and swept volume.

In exhaust gas turbocharging, some of the exhaust gas energy, which would normally be wasted, is used to drive a turbine. The turbocharger returns some of this normally wasted exhaust energy back into the engine, contributing to the engine's efficiency and saving fuel. A compressor, which is mounted on the same shaft as the turbine, draws in filtered ambient air, compresses it, and then supplies it to the engine.

A turbocharger is a type of forced induction system used with internal combustion engines. Turbochargers deliver compressed air to an engine intake, allowing more fuel to be combusted, thus boosting an engine's horsepower without significantly increasing engine weight. Thus, turbochargers permit the use of smaller engines that develop the same amount of horsepower as larger, naturally aspirated engines. Using a smaller engine in a vehicle has the desired effect of decreasing the mass of the vehicle and enhancing fuel economy. Moreover, the use of turbochargers permits more complete combustion of the fuel delivered to the engine, which contributes to the highly desirable goal of a cleaner environment.

Turbochargers typically include a turbine housing connected to the engine's exhaust manifold, a compressor housing connected to the engine's intake manifold, and a center bearing housing coupling the turbine and compressor housings together. A turbine wheel in the turbine housing is rotatably driven by an inflow of exhaust gas supplied from the exhaust manifold. A shaft rotatably supported in the center bearing housing connects the turbine wheel to a compressor impeller in the compressor housing so that rotation of the turbine wheel causes rotation of the compressor impeller. The shaft connecting the turbine wheel and the compressor impeller defines an axis of rotation. As the compressor impeller rotates, it increases the air mass flow rate, airflow density and air pressure delivered to the engine's cylinders via the engine's intake manifold.

Friction minimizing systems are common in the design of turbochargers due to their high rotating speed. With a sleeve bearing, the shaft turns on an oil film on a bushing or the like. For the turbocharger, the oil supply may come from the engine oil circuit. Floating bushings, rotating slower than shaft speed, can be situated between the stationary center bearing housing and the rotating shaft to reduce friction.

Thrust bearings support axial loads from the rotating impellers/wheels. Regarding forces in an axial direction, as the forces acting on the compressor and turbine wheels in an axial direction are of differing magnitude, the shaft and turbine wheel assembly is displaced in an axial direction.

The axial thrust bearing supports these forces. Small discs or rings fixed on the shaft may serve as running surfaces with an oil film in between. The axial bearing may be fixed in the center bearing housing. An oil-deflecting plate may also be present to prevent the oil from entering the shaft sealing area.

Because the generated friction of a tapered-land bearing is sensitive to geometry, load, speed, and lubricant, such tapered-land bearing of a single/fixed geometry can be designed to meet a narrow operating range. For vehicle turbochargers, thrust bearings have been stamped or machined from one piece yielding a single geometry. Vehicle turbochargers experience a much larger operating range than most turbomachinery. Thus, an adaptive variable geometry thrust bearing is beneficial by offering optimal performance over a large operating range. It is desirable therefore to provide a turbocharger with an improved tapered-land thrust bearing assembly.

SUMMARY

The disclosure provides for an oil-lubricated, tapered-land thrust bearing assembly for automotive turbochargers including a flinger sleeve, thrust washer, a complementary bearing housing cover, and a thrust bearing. The thrust bearing includes an assembly of three components: one base and at least one insert on either side of the base, which are designed to control the oil film as a purposefully compliant structure. The tapered-land geometry of the thrust bearing and thus the behavior of the oil film is further dependent on the applied force due to the changing ramp angle. The changing ramp angle extends the range of operation between low and high shaft operating speeds in the form of increased axial load capacity and reduced bearing power consumption.

The ramp and land of the thrust bearing are improved as they can adjust with applied load. An un-deformed pad surface allows for less friction during lower-load performance, such as at lower shaft speed and turbo power. As the force increases, friction becomes less important overall during high-power operation, such as during higher turbo speed. The higher load presses on the ramp, and the ramp (taper) angle gets smaller and the effective land area is increased. This allows the bearing to generate more load supporting pressure, thus extending the operating range of the bearing.

Oil flow to the bearing is also important. When the bearing flow resistance is low, an excess of oil flow will be detrimental to efficiency, such as at low speed. Friction may also be higher with cold oil. The disclosed thrust bearing assembly helps control oil flow in both flow rate and distribution within the system.

As the velocity of the rotating shaft increases, the oil flow rate also increases. The bearing generates higher pressure due to increased speed. Unlike prior art one-piece thrust bearings, the compliant pad inserts provide for a variable effective geometry of the tapered-land thrust bearing.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

Figure 1:
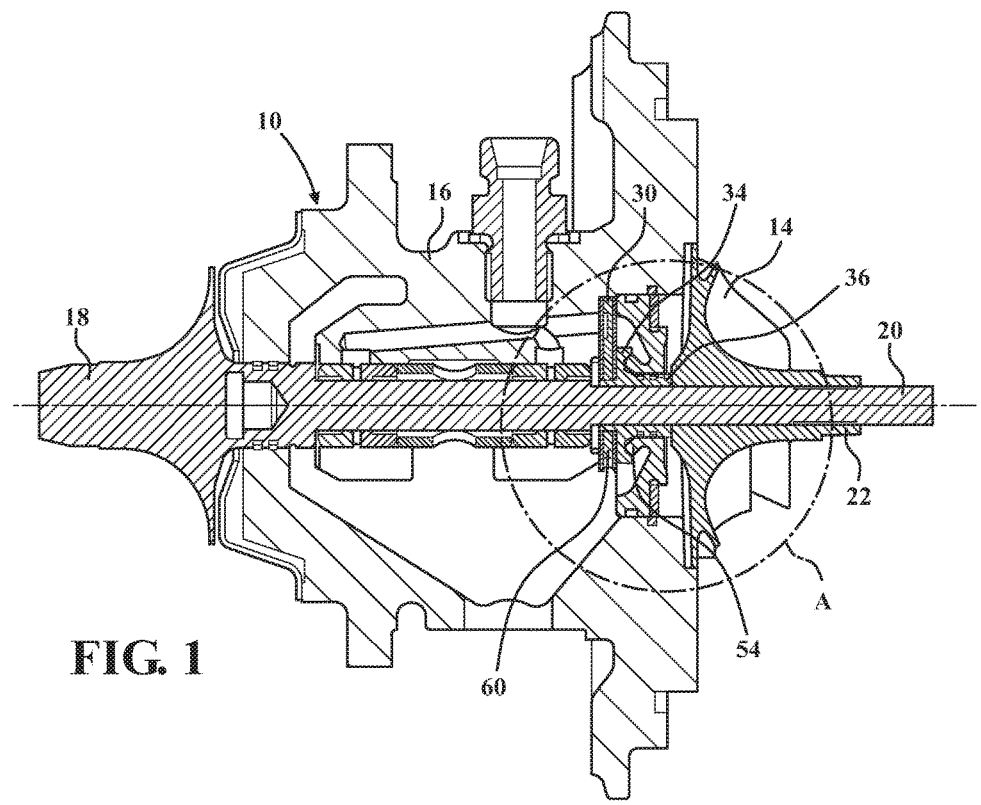
FIG. 1 is a cross-sectional side view of a turbocharger without turbine and compressor housings.
Figure 2:
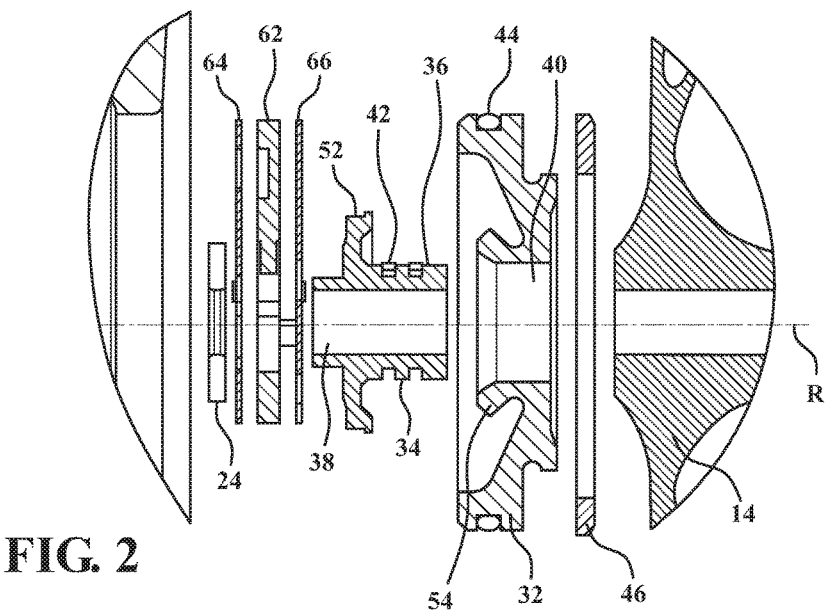
FIG. 2 is an exploded view of section A of FIG. 1.
Figure 3:
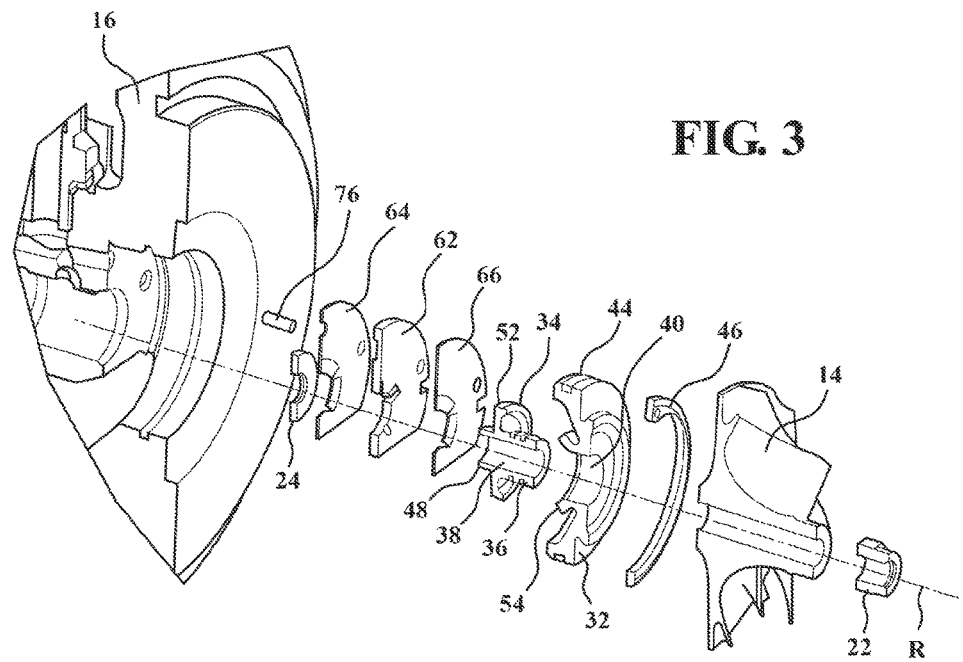
FIG. 3 is an exploded view of the compressor end of a turbocharger.
Figure 4:
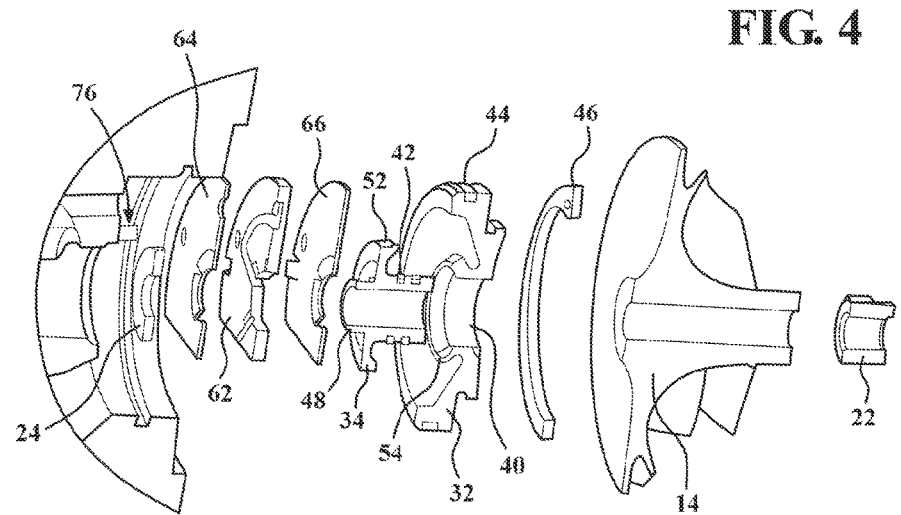
FIG. 4 is another exploded view of the compressor end of a turbocharger from an inner view.
Figure 5:
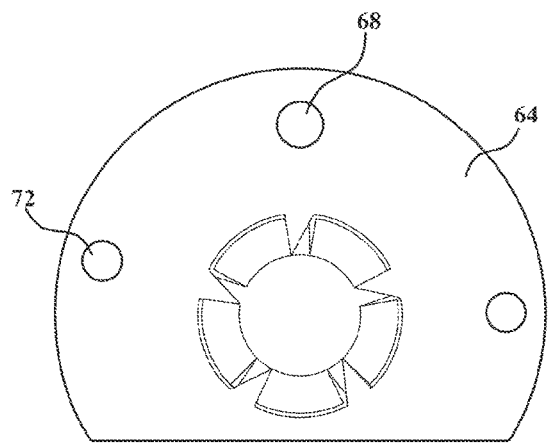
FIG. 5 is a planar view of an inner insert of a thrust bearing.
Figure 6:
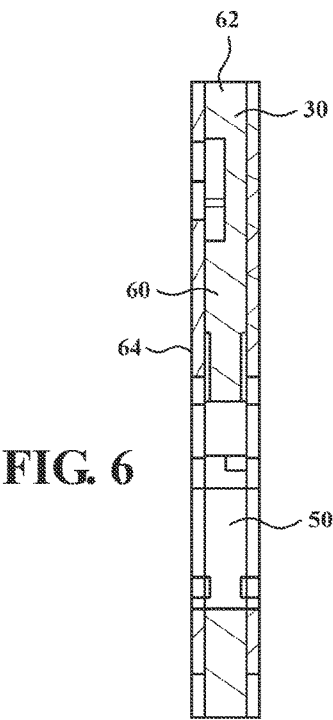
FIG. 6 is a cross sectional view of a thrust bearing having an inner insert, base, and outer insert.
Figure 7:
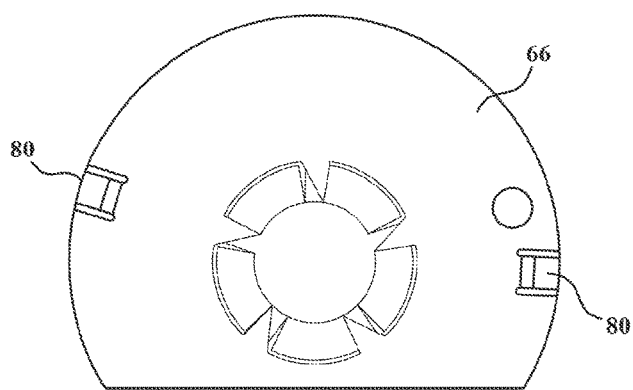
FIG. 7 is a planar view of an outer insert.
Figure 8:
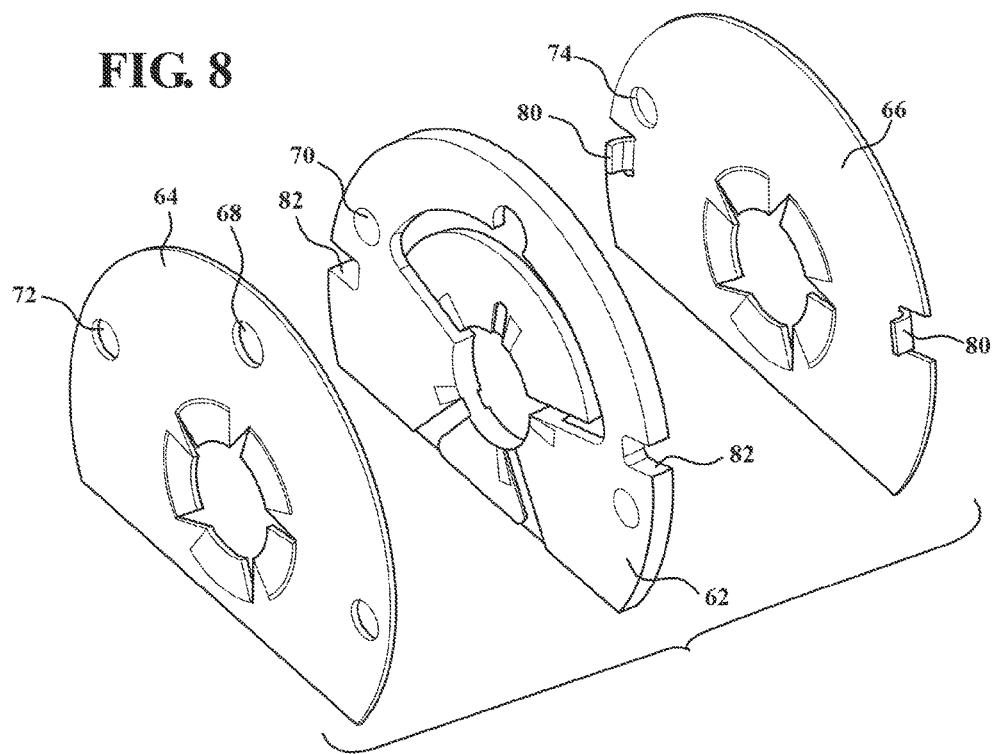
FIG. 8 is an exploded view of a thrust bearing having an inner insert, a base, and an outer insert.

Referring to FIG. 1, a turbocharger is illustrated generally at 10. The turbocharger 10 can include a compressor impeller 14, a bearing housing 16, and a turbine wheel assembly 18. A shaft 20 that is rotatably supported in the bearing housing 16 and connects the turbine wheel assembly 18 to the compressor impeller 14 such that rotation of the turbine wheel assembly 18 causes rotation of the compressor impeller 14. The rotatable shaft 20 extends in an axial direction and defines an axis of rotation R. A compressor impeller 14 is mounted on one end of the shaft 20 and is housed within a compressor housing (not shown). A compressor nut 22 can securely retain the compressor impeller 14 to the distal end of the shaft 20. A turbine wheel assembly 18 is attached to or mounted on an opposite end of the shaft 20 and accepts a flow of exhaust gas from a standard exhaust manifold (not shown). As the compressor impeller 14 rotates, air is drawn in and is compressed to be delivered at an elevated pressure to an engine intake manifold. As is known in the art, the turbine wheel assembly 18 is rotatably driven by an inflow of the exhaust gas supplied from the exhaust manifold, which rotates the shaft 20, thereby causing the compressor impeller 14 to rotate. In other words, the compressor impeller 14 is rotatably driven by the turbine wheel assembly 18. After driving the turbine wheel assembly 18, the exhaust gas is discharged.

The shaft 20 can be rotatably supported in the bearing housing 16 by a variety of known bearings or sleeves, such as a spacer sleeve.

The shaft 20 may have a thrust washer 24 surrounding the shaft 20, such as a washer or similar device that cooperates with a stationary thrust bearing 30 to handle axial loads in the turbocharger 10. The shaft 20 may also pass through a bearing housing cover 32 and a flinger sleeve 34 that are located adjacent to a back-wall of the compressor impeller 14. The thrust bearing 30 may abut the bearing housing cover 32, which may contain a portion of the flinger sleeve 34, as formed in the compressor side of the bearing housing 16. The bearing housing cover 32 can be securely sealed to the bearing housing 16. The bearing housing cover 32 and flinger sleeve 34 cooperate to seal oil from the compressor wheel 14 and to keep the compressed air from leaking into the bearing housing 16. The flinger sleeve 34 includes a hollow cylindrical end portion 36 that is adjacent to the compressor impeller 14. The shaft 20 exits the bearing housing 16 through a bore 38 in the end portion 36 of the flinger sleeve 34 that passes in a cover bore 40 in the bearing housing cover 32. The flinger sleeve 34 rotates with the shaft 20, and the end portion 36 is disposed in the bearing housing cover bore 40. A ring 42 can be seated in a groove on the end portion 36 of the flinger sleeve 34 and forms a gas seal between the flinger sleeve 34 and an inner circumference of the cover bore 40 of the bearing housing cover 32. An O-ring 44 can be seated in a groove on an outer circumference of the bearing housing cover 32 and forms a gas seal between the bearing housing cover 32 and the bearing housing 16. Other sealing methods exist such as RTV type sealant, interference fits, gaskets, and the like.

A snap ring 46 secures the bearing housing cover 32 in place adjacent to the compressor wheel 14. The snap ring 46 secures the bearing housing cover 32 and thrust bearing 30 into the bearing housing 16. A similar device can also be attached to the bearing housing with one or more fasteners, or adhesive, or snap-tabs and the like.

The compressed air can be prevented from entering the bearing housing 16 on the compressor side by the O-ring 44 or snap ring 46, which is not an oil seal.

The opposite distal end portion 48 of the flinger sleeve 34 is adjacent to a bore 50 of the thrust bearing 30.

The flinger sleeve 34 also includes a lip 52 having a circumference that is greater than the circumference of each of the hollow cylindrical end portion 36 and the distal end portion 48. The lip 52 is disposed between the bearing housing cover 32 and the thrust bearing 30. The bearing housing cover 32 preferably has a complementary lip 54 than aligns with the lip 52 of the flinger sleeve 34. Oil circulates through the bearing housing 16 to provide lubrication.

On the compressor side, oil contained by the lip 52 of the flinger sleeve 34 in conjunction with a complementary lip 54 in the bearing housing cover 32 as the shaft 20 rotates and oil can be redirected into an oil passage. The bearing housing cover 32 and flinger sleeve 34 cooperate to prevent oil from being sucked into the compressor wheel 14 and to keep the compressed air from leaking into the bearing housing 16.

Referring to FIGS. 1 through 8, the thrust bearing 30 can be an oil-lubricated, tapered-land thrust bearing assembly 60 for a turbocharger 10. The thrust bearing assembly 60 has three components: a base 62 with an inner insert 64 and an outer insert 66, which are designed to control the oil film based on applied force as a purposefully compliant structure. The inner insert 64 and the outer insert 66 are constrained from rotating on the shaft axis relative to the base 62. A single insert is possible where a thrust bearing only supports loads in one direction. The tapered-land geometry of the thrust bearing assembly 60 and thus the behavior of the oil film is dependent on the applied force. It optimizes performance between and including low and high power operating speeds by increasing axial load capacity and reducing bearing power. At a low load, the ramp (taper) angle is relatively large and varies to a flat land with a smaller ramp angle at higher loads. The compliant, flexible land with a varying effective geometry can further improve performance given the turbocharger operating range.

The ramp and land of the thrust bearing assembly 60 are improved as they can adjust with load. The thrust bearing assembly 60 optimizes high load and low-load performance. At low load, flat land area is reduced, and at high load, flat land area increases for maximum load capacity. An un-deformed outer surface allows for less friction per axial force during low-load performance, such as at lower speed. Friction loss is reduced at such lower speeds and loads. The deformable ramp section does not have as much axial force pressing it down. As the force increases, friction becomes less important overall during high-load performance, such as during higher turbocharger speed. The higher load presses on the ramp, and the angle gets smaller. The compliant deformable aspect extends the operating load and friction range of the thrust bearing assembly 60.

In FIGS. 1 though 8, the outer circumference at upper sides of the inner insert 64 and the outer insert 66 align with the base 62 and an outer circumference of the bearing housing cover 32, and the bottom circumference of the thrust bearing 30 is absent to allow flow of oil. The base 62 may include oil drain slots. The pad deflection stops on the base.

In the present embodiment, the inner insert 64 may have an aperture 68 as shown when the inner insert 64 is installed, which is specifically for oil flow to the base 62 of the thrust bearing assembly 60. It is understood that depending on turbo arrangement, oil can come from either side. Alternate oil flow apertures may be in the base 62 or the outer insert 66.

A series of aligned holes 70, 72 and 74 in the base 62 and each insert 64 and 66, respectively, can be held by a pin 76 that passes through the aligned holes 70, 72 and 74. A pin 76 also secures the thrust bearing assembly 60 to the bearing housing 16, which will also prevent rotation of the thrust bearing assembly 60 relative to the bearing housing 16. The pin 76 can be secured to the bearing housing 16 in a hole or other means. One can also use non-circular interface geometry inside the bearing housing if a pin is not considered to constrain rotation.

In the present embodiment, the outer insert 66 has a tab 80, preferably integrated as sheet metal tabs on its outer circumference that aligns with a recess 82 in the base 62 to secure the outer insert 66 to the base 62. This has proven to be production friendly, but various means of clamping or fastening the inserts 64 and 66 to the base 62 can be utilized to form the thrust bearing 30, such as clips, adhesive and other fastening means.

Figure 9:
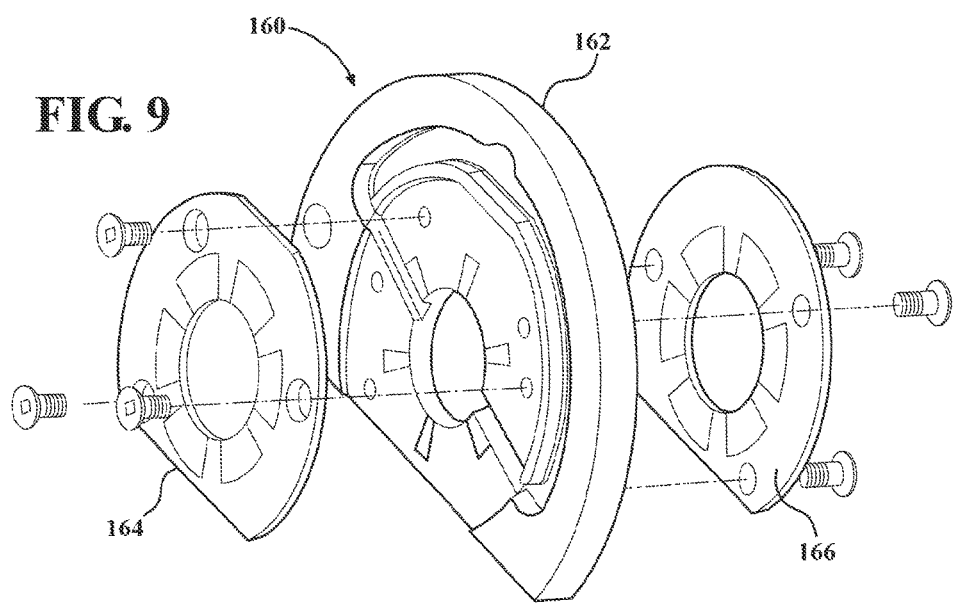
FIG. 9 is a perspective exploded view of a thrust bearing according to a second embodiment of the disclosure.

Referring to FIG. 9, wherein the reference numerals represent similar elements as those described above, a second embodiment of the thrust bearing assembly 160 includes inserts 164 and 166 that are a smaller diameter than base 162 and thus the bearing housing cover 32. Also, another means is shown to fix the inserts 164 and 166 to the base 162. More specifically, a series of threaded screws pass through each insert 164 and 166 and secure into the base 162.

Figure 10:
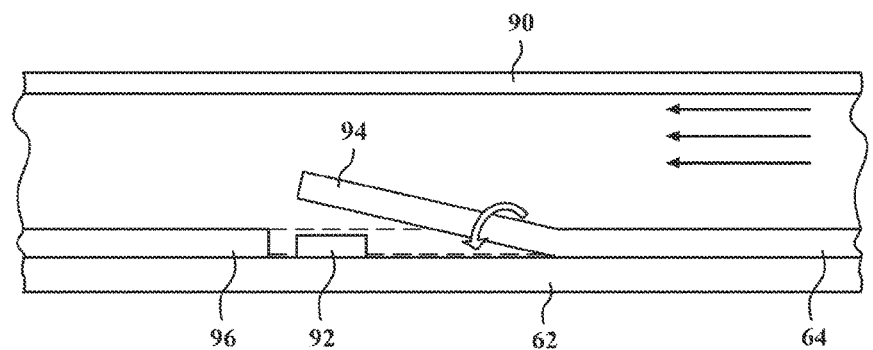
FIG. 10 is a schematic of the structure illustrating the deformable nature of the bearing surface at a low load.
Figure 11:
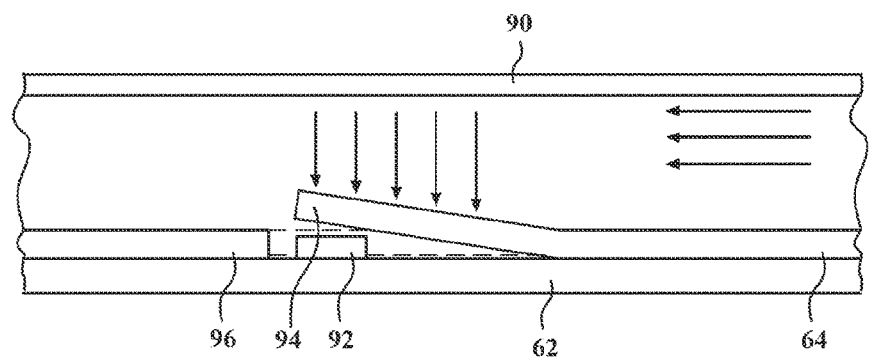
FIG. 11 is a schematic of the structure illustrating the deformable nature of the bearing surface at an increased load.
Figure 12:
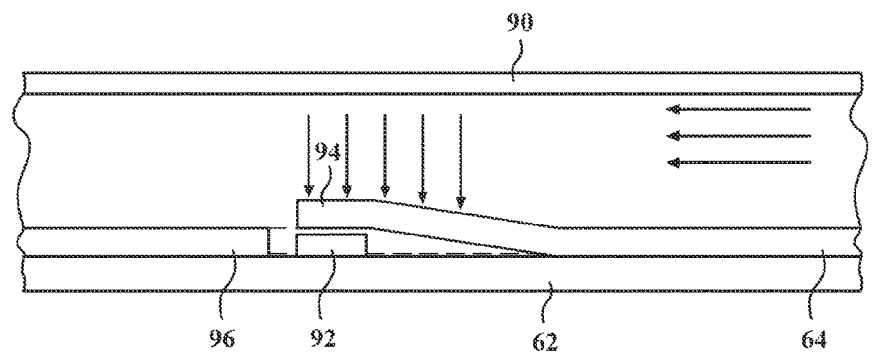
FIG. 12 is a schematic of the structure illustrating the deformable nature of the bearing surface at an increased load with a flat land area.

FIGS. 10 through 12 are schematics of the structure illustrating the deformable nature of the bearing surface. In FIG. 10, the ramp angle is largest at low load, then FIGS. 11 and 12 show decreases in the ramp angle as the load increases. At low load, the ramp angle is largest and then decreases at higher loads. These figures also show a flat land area change between low load in FIG. 10 and then high load as shown in FIG. 12. The ramp angle is relatively large at a low load and decreases to a smaller ramp angle at higher loads; whereas, the flat land area is minimized at the low load and varies to a larger land area at higher loads.

In FIGS. 10-12, the arrows on the right side indicate oil flow between a runner 90 and a thrust bearing base 62. The curved arrow of FIG. 10 shows a force on an end 94 of the insert 64 relative to the base 62 and stop 92. The stop 92 is broadly described for schematic purposes. The vertical arrows of FIGS. 11 and 12 show force, and FIG. 12 shows compliance of the deformable end 94 of the insert 64 relative to the stop 92. A thrust bearing insert end 96 is shown adjacent to the stop 92 secured to the base 62.

Figure 13:
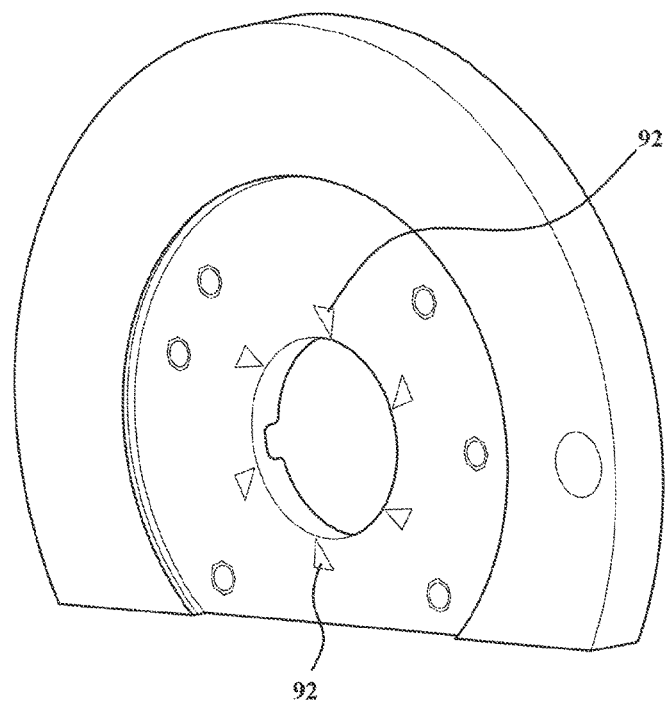
FIG. 13 shows a bearing assembly component with a stop with a triangular base.
Figure 14:
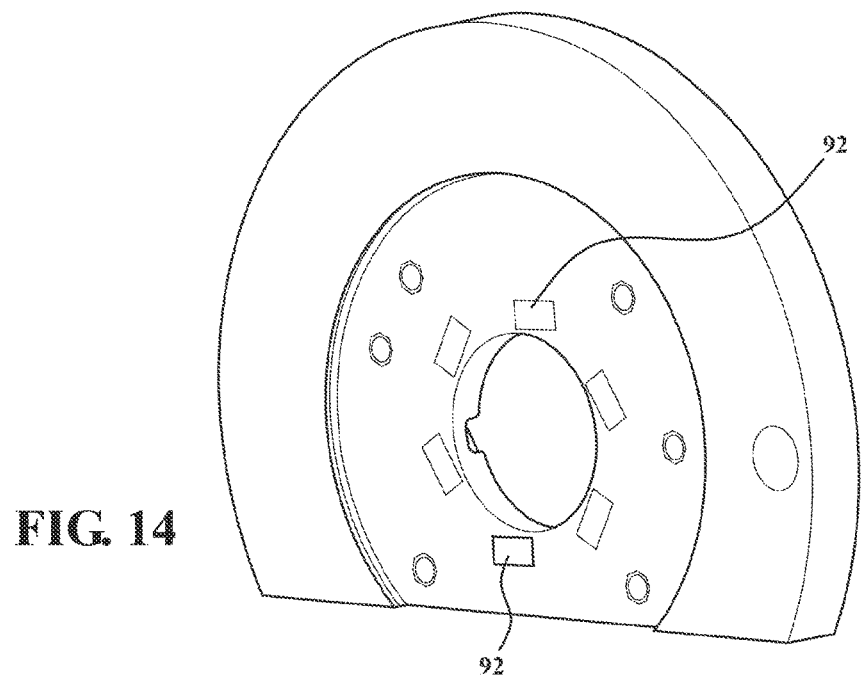
FIG. 14 shows a bearing assembly component with a stop with a rectangular base.
Figure 15:
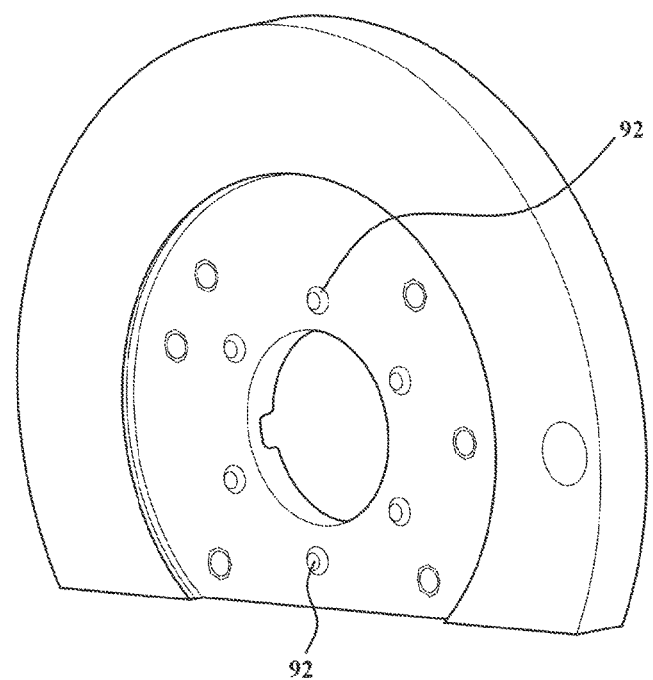
FIG. 15 shows a bearing assembly component with a stop with a round base.

FIGS. 13-15 show different stop geometries and numbers of stops 92. FIG. 13 shows six stops 92 with a triangular base. FIG. 14 shows six stops 92 with a rectangular base. FIG. 15 shows five stops 92 with a round base, which can be dome-shaped. Such stops 92 determine the pad height and shape as the pads, such as insert 64, deflect downward (under load).

Figure 16:
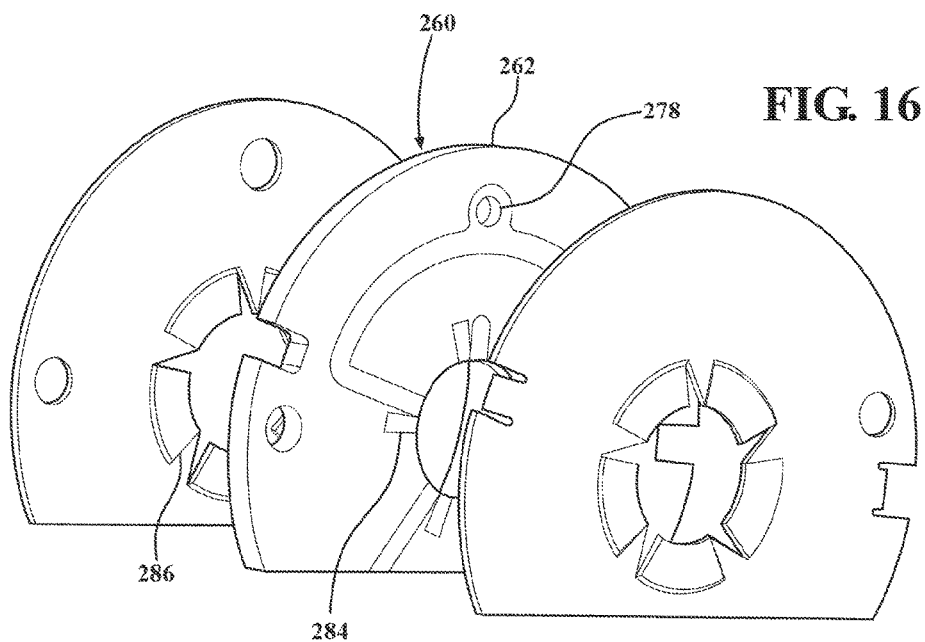
FIG. 16 shows a perspective exploded view of a thrust bearing according to a third embodiment.

FIG. 16 shows a perspective exploded view of a thrust bearing 260 according to another embodiment. The base 262 adds an orifice 278 to control oil flow from one side to the other. The orifice 278 can be used for flow control to the non-supplied side. This embodiment does not have a thru slot adjacent to the bore in the base 262. Further the pad stop 284 is shown more rectangular since it does not need to be sector or "pie" shaped. To show variations with this disclosure, the bend line 286 is shown as not radial or converging to the center of the bore. As shown along the axis, the shape of the ramp, groove, and stop can vary within the scope of the disclosure.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. An oil-lubricated, tapered-land thrust bearing assembly for a turbocharger that includes a compressor impeller and a turbine wheel connected by a rotating shaft that passes through a bearing housing, the tapered-land thrust bearing assembly comprising:

a base comprising a first side and an opposing second side;

a first insert disposed on the first side of the base, the first insert being monolithic and defining a first planar surface, the first insert including a first plurality of ramps, wherein each of the first plurality of ramps is cantilevered and oriented at a ramp angle relative to the first planar surface, wherein each of the first plurality of ramps is deflectable toward the first planar surface in response to an applied force thereby changing the ramp angle to control oil film; and a second insert disposed on the second side of the base, the second insert being monolithic and defining a second planar surface, the second insert including a second plurality of ramps, wherein each of the second plurality of ramps is cantilevered and oriented at a ramp angle relative to the second planar surface, and wherein each of the second plurality of ramps is deflectable toward the second planar surface in response to an applied force such that the ramp angle changes to control oil film.

2. The tapered-land thrust bearing assembly of claim 1 wherein at least one of the first and second inserts includes an aperture for flow of oil.

3. The tapered-land thrust bearing assembly of claim 1 wherein the ramp angle decreases as the applied force increases.

4. The tapered-land thrust bearing assembly of claim 1 further comprising a bearing housing cover having a cover bore, the bearing housing cover is secured in the bearing housing and a flinger sleeve having a hollow cylindrical end that fits in the cover bore, wherein the rotating shaft passes through the hollow cylindrical end in the flinger sleeve.

5. The tapered-land thrust bearing assembly of claim 4 further comprising a snap ring that secures the bearing housing cover, the base, the first insert, and the second insert into the bearing housing.

6. The tapered-land thrust bearing assembly of claim 5 wherein the bearing housing cover includes an O-ring around an outer circumference of the bearing housing cover.

7. The tapered-land thrust bearing assembly of claim 6 wherein the bearing housing cover with the O-ring and the snap ring prevent gas from entering the bearing housing.

8. The tapered-land thrust bearing assembly of claim 4 wherein a portion of an outer circumference of the first insert and a portion of an outer circumference of the second insert align with an outer circumference of the bearing housing cover.

9. The tapered-land thrust bearing assembly of claim 4 wherein the flinger sleeve includes a lip having a circumference greater than a circumference of the hollow cylindrical end, and the bearing housing cover including a complementary lip that aligns with the lip of the flinger sleeve.

10. The tapered-land thrust bearing assembly of claim 1 wherein deflection of the first and second plurality of ramps of the first and second inserts is dependent on the applied force to optimize performance, wherein the ramp angle decreases as the applied force increases; and a stop formed on the first and second side of the base and below an outer surface of the first and second inserts for engaging the first and second plurality of ramps of the first and second inserts in response to increases in the applied force, wherein the first and second plurality of ramps become substantially parallel with the first and second planar surface of the inserts.

11. The tapered-land thrust bearing assembly of claim 1 wherein the first insert and the second insert are fastened on each side of the base.

12. The tapered-land thrust bearing assembly of claim 1 further comprising a thrust washer that surrounds the rotating shaft and is adjacent to the first insert.

13. An oil-lubricated, tapered-land thrust bearing assembly in a turbocharger having a compressor impeller and a turbine wheel connected by a rotating shaft that passes through a bearing housing, the tapered-land thrust bearing assembly comprising:

a thrust bearing having a base, an inner insert and an outer insert, the inserts having integral ends extending axially away from the base to control film based on applied force, wherein the rotating shaft passes through a bore in the thrust bearing, and wherein the base, the inner insert and the outer insert each include a hole aligned with each other, the bearing assembly further including a pin that passes through the aligned holes to prevent rotation of the thrust bearing relative to the bearing housing, wherein the pin is secured to the bearing housing.

14. An oil-lubricated, tapered-land thrust bearing assembly in a turbocharger having a compressor impeller and a turbine wheel connected by a rotating shaft that passes through a bearing housing, the tapered-land thrust bearing assembly comprising:

a thrust bearing having a base, an inner insert and an outer insert, the inserts having integral ends extending axially away from the base to control film based on applied force, wherein the rotating shaft passes through a bore in the thrust bearing, wherein the inner insert and the outer insert are fastened on each side of the base and wherein one of the inserts has a tab on its outer circumference that secures to a corresponding recess in the base.

15. An oil-lubricated, tapered-land thrust bearing assembly for a turbocharger that includes a compressor impeller and a turbine wheel connected by a rotating shaft that passes through a bearing housing, the tapered-land thrust bearing assembly comprising:

a bearing housing cover having a cover bore and a circular lip with a circumference larger than the cover bore, the bearing housing cover is secured within the bearing housing;

a flinger sleeve having an end that fits in the cover bore, the flinger sleeve includes a complementary lip that aligns with the lip of the bearing housing;

a base comprising a first side and a second side; and a first insert disposed on the first side of the base and a second insert disposed on the second side of the base, the first and second inserts being monolithic, and the first insert defining a first planar surface, and the second insert defining a second planar surface wherein the first insert has a plurality of first ramps, and the second insert has a plurality of second ramps, wherein each of the first and second plurality of ramps is cantilevered and oriented at a ramp angle relative to the first and second planar surface, and wherein each of the first and second plurality of ramps is deflectable toward the first and second planar surfaces to control oil film based on an applied force, the first insert and the second insert are fastened on each side of the base, wherein the first and second plurality of ramps are deflectable based on the applied force to optimize performance, wherein the ramp angle decreases as the applied force increases.

16. The tapered-land thrust bearing assembly of claim 15 wherein at least one of the first and second inserts includes an aperture for flow of oil.

17. An oil-lubricated, tapered-land thrust bearing assembly comprising:

a base with a stop; and a first and second insert being monolithic and disposed on opposite sides of the base, the first and second insert each having a planar surface and a ramp extending at a ramp angle from the planar surface, wherein the ramps are deformable relative to the stop on the base such that when the ramps engage the stop, an end of the ramp becomes flat.

18. The taper-land thrust bearing assembly of claim 17 wherein the ramp angle decreases as applied forced increases.

19. The tapered-land thrust bearing assembly of claim 17 wherein the first and second insert includes an aperture for flow of oil.

* * * * *

UNITED STATES PATENT AND TRADEMARK OFFICE
CERTIFICATE OF CORRECTION

PATENT NO. : 10,036,422 B2
APPLICATION NO. : 14/395567
DATED : July 31, 2018
INVENTOR(S) : Jason Moscetti et al.

Page 1 of 1

It is certified that error appears in the above-identified patent and that said Letters Patent is hereby corrected as shown below:

In the Specification

Column 1, Line 9, delete "02933" and insert -- 029233 --.

Signed and Sealed this
Twenty-fifth Day of September, 2018

Andrei Iancu
*Director of the United States Patent and Trademark Office*